(12) United States Patent
Yakovenko et al.

(10) Patent No.: US 9,092,281 B2
(45) Date of Patent: Jul. 28, 2015

(54) FAST REMOTE PROCEDURE CALL

(71) Applicant: QUALCOMM Incorporated, San Diego, CA (US)

(72) Inventors: Anatoly E. Yakovenko, Encinitas, CA (US); Ramesh Chandrasekhar, Oceanside, CA (US); Vivek Iyer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 13/633,288

(22) Filed: Oct. 2, 2012

(65) Prior Publication Data

US 2014/0096148 A1    Apr. 3, 2014

(51) Int. Cl.
G06F 9/54    (2006.01)

(52) U.S. Cl.
CPC ............. *G06F 9/544* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 5,218,699 A * | 6/1993 | Brandle et al. | 719/328 |
| 5,659,701 A * | 8/1997 | Amit et al. | 719/317 |
| 6,131,126 A | 10/2000 | Kougiouris et al. | |
| 6,151,639 A | 11/2000 | Tucker et al. | |
| 6,226,689 B1 * | 5/2001 | Shah et al. | 719/314 |
| 6,308,225 B1 | 10/2001 | Schofield | |
| 6,708,223 B1 | 3/2004 | Wang et al. | |
| 6,728,788 B1 | 4/2004 | Ainsworth et al. | |
| 6,832,266 B1 | 12/2004 | Shaylor | |
| 6,934,953 B2 | 8/2005 | Stevens | |
| 7,240,182 B2 | 7/2007 | Day et al. | |
| 7,788,314 B2 | 8/2010 | Holt | |
| 2002/0019843 A1 * | 2/2002 | Killian et al. | 709/102 |
| 2004/0154020 A1 | 8/2004 | Chen et al. | |
| 2008/0126762 A1 | 5/2008 | Kelley et al. | |
| 2010/0229183 A1 | 9/2010 | Bae et al. | |

FOREIGN PATENT DOCUMENTS

| | | |
|---|---|---|
| JP | 3224044 A | 10/1991 |
| KR | 1020010041293 A | 5/2001 |
| WO | 9944126 A2 | 9/1999 |

OTHER PUBLICATIONS

Bershad B.N., et al., "Lightweight Remote Procedure Call" Operating Systems Review, ACM, New York, NY, US, vol. 23 (5), Jan. 1, 1989, pp. 102-113, XP000115491, ISSN: 0163-5980.

(Continued)

*Primary Examiner* — Shih-Wei Kraft
(74) *Attorney, Agent, or Firm* — Nicholas A. Cole

(57) ABSTRACT

A method for performing a remote procedure call between an application processor and a digital signal processor within a computing device. The computing device may compile interface description language data to generate stub software that executes on the application processor and skel software that executes on the digital signal processor. When an application executing on the application processor invokes a remote procedure call, the application processor may pack argument data within stack memory and transmit an interrupt to the digital signal processor, which may map the physical memory addresses of the argument data into local address space such that no copies of the argument data is made. The digital signal processor may execute skel software that unpacks the argument data and executes a service related to the remote procedure call.

40 Claims, 8 Drawing Sheets

(56) References Cited

OTHER PUBLICATIONS

International Search Report and Written Opinion—PCT/US2013/045698—ISA/EPO—Oct. 18, 2013.
Liedtke J.: "Improving IPC by Kernel Design" Operating Systems Review, ACM, New York, NY, US vol. 27, No. 5, Dec. 1, 1993, pp. 175-188, XP000418692, ISSN: 0163-5980.
Schroeder M.D., et al., "Performance of Firefly RPC" ACM Transactions on Computer Systems (TOCS), Association for Computing Machinery, Inc, US, vol. 8 (1), Feb. 1, 1990, pp. 1-17, XP000113131, ISSN: 0734-2071.
Andreas Haeberien et al., "Stub-Code Performance is Becoming Important," Proceedings of the First Workshop on Industrial Experiences With Systems Software (WIESS), San Diego, Oct. 2000.

* cited by examiner

FAST REMOTE PROCEDURE CALL

BACKGROUND

Modern computing devices may employ multiple processing units to execute various applications, such as media and games apps, as well as provide many services, including cellular telephony and data network communications. For example, a smartphone computing device may have a primary processor (or application processor) for performing operating system routines, a processor for handling incoming cellular modem data, and a graphics processor for rendering video data. A computing device may include a digital signal processor (DSP) that may act as a co-processor of an application processor, typically receiving instructions and workloads from the application processor. The digital signal processor may also share pre-allocated memory with the application processor that may be used with various software applications executing on the application processor, such as applications involving audio (or voice) data. Such audio applications may include codec protocols, digital signal to analog data conversions, and noise/echo cancellations within audio samples/streams.

As programmable computing units, digital signal processors have significant computational capabilities with high computing rates (e.g., millions of instructions per second) with relatively low power consumption rates. However, digital signal processors may be underused by computing device applications due to limitations in inter-processor communications that make utilizing the digital signal processor difficult for application developers. Since digital signal processors typically employ a different operating system than conventional processors, digital signal processors may not share the same function sets/calls as the computing device's application processor. Thus, applications written to execute on the application processor would require special operations in order to call functions that would execute on the digital signal processor. For example, digital signal processor programming may involve highly complicated assembly code programming to manage memory accesses, whereas a median application executing on an application processor may be based in a high-level, object-oriented programming language.

Currently, digital signal processors may be used efficiently by applications that perform large workloads (e.g., audio and voice data operations). However, data transport latencies may be too high to allow for efficient use in other contexts. For example, it may be inefficient to use a digital signal processor to perform small computations when each computation takes a few hundred microseconds. Additionally, memory management between an application processor and a digital signal processor may require different technologies. For example, network style protocols may be used by an application processor to access services on a digital signal processor; however such operations may require extensive out-of-band memory management operations and resources. Due to the different standards and costly latencies, applications programmers generally do not fully utilize digital signal processor resources to provide computational support for applications. Thus, the digital signal processor remains a powerful but underutilized resource in mobile computing devices.

SUMMARY

The various aspects may disclose methods and devices for performing remote procedure calls within a computing device between a digital signal processor and an application processor executing an application. An aspect method may include executing stub software instructions on the application processor to perform a remote procedure call requested by a caller thread of the application, wherein the remote procedure call is defined in header data associated with the stub software instructions, executing skel software instructions on the digital signal processor to handle the remote procedure call requested by the caller thread, packing argument data in stack memory corresponding to the caller thread based on the stub software instructions, transmitting a first signal from the application processor that instructs the digital signal processor to execute the remote procedure call using physical memory addresses of the packed argument data, mapping the physical memory addresses of the packed argument data in the stack memory corresponding to the caller thread to a local address space of the digital signal processor in response to receiving the transmitted first signal and based on the skel software instructions, unpacking the argument data to the local address space based on the skel software instructions, and performing a service in the digital signal processor associated with the remote procedure call based on the skel software instructions and the unpacked argument data. In an aspect, the method may also include transmitting a second signal to the digital signal processor indicating that the stub software instructions are preparing the first signal associated with the remote procedure call, and configuring the digital signal processor to execute the skel software instructions and the service related to the remote procedure call based on receiving the second signal. In an aspect, configuring the digital signal processor to execute the skel software instructions and the service related to the remote procedure call based on receiving the second signal may include configuring the digital signal processor to wake from a sleep mode. In an aspect, configuring the digital signal processor to execute the skel software instructions and the service related to the remote procedure call based on receiving the second signal may include configuring the digital signal processor to open a service session related to the remote procedure call. In an aspect, the method may also include packing output argument data in the stack memory corresponding to the caller thread based on the local address space of the digital signal processor and the skel software instructions, and transmitting a return signal from the digital signal processor indicating that output argument data is within the stack memory corresponding to the caller thread. In an aspect, the method may also include configuring the caller thread to operate in a wait mode in response to transmitting the first signal, configuring the caller thread to operate in an active mode in response to receiving the return signal from the digital signal processor, and unpacking the output argument data in the stack memory corresponding to the caller thread based on the stub software instructions. In an aspect, the method may also include unmapping from the local address space the physical memory addresses of the stack memory corresponding to the caller thread in response to transmitting the return signal and based on the skel software instructions. In an aspect, stub software instructions, header data and skel software instructions may be generated by creating data that describes an interface description language that includes at least one remote procedure call capable of being performed by the service on the digital signal processor, and compiling in an interface description language compiler the created data describing the interface description language to generate stub software instructions formatted for execution by the application processor, skel software instructions formatted for execution by the digital signal processor, and header data formatted for compatibility with the application processor. In an aspect, the stub software instructions formatted for execution by the application processor may be high-level programming language code instructions, and the skel software instructions formatted for execution by the digital signal processor may be assembly language code instructions. In an aspect, packing argument data in stack memory corresponding to the caller thread based on the stub software instructions may include storing constant-size arguments within a single input buffer in the stack memory corresponding to the caller thread, and storing pointers that describe physical memory addresses of variable-size argument data structures within a buffer in the stack memory corresponding to the caller thread.

An aspect may include a computing device that includes means for executing stub software instructions on an application processor to perform a remote procedure call requested by a caller thread of an application, wherein the remote procedure call is defined in header data associated with the stub software instructions, means for executing skel software instructions on a digital signal processor to handle the remote procedure call requested by the caller thread, means for packing argument data in a stack memory corresponding to the caller thread based on the stub software instructions, means for transmitting a first signal from the application processor that instructs the digital signal processor to execute the remote procedure call using physical memory addresses of the packed argument data, means for mapping the physical memory addresses of the packed argument data in the stack memory corresponding to the caller thread to a local address space of the digital signal processor in response to receiving the transmitted first signal and based on the skel software instructions, means for unpacking the argument data to the local address space based on the skel software instructions, and means for performing a service in the digital signal processor associated with the remote procedure call based on the skel software instructions and the unpacked argument data. In an aspect, the computing device may further include means for transmitting a second signal to the digital signal processor indicating that the stub software instructions are preparing the first signal associated with the remote procedure call, and means for configuring the digital signal processor to execute the skel software instructions and the service related to the remote procedure call based on receiving the second signal. In an aspect, means for configuring the digital signal processor to execute the skel software instructions and the service related to the remote procedure call based on receiving the second signal may include means for configuring the digital signal processor to wake from a sleep mode. In an aspect, means for configuring the digital signal processor to execute the skel software instructions and the service related to the remote procedure call based on receiving the second signal may include means for configuring the digital signal processor to open a service session related to the remote procedure call. In an aspect, the computing device may further include means for packing output argument data in the stack memory corresponding to the caller thread based on the local address space of the digital signal processor and the skel software instructions, and means for transmitting a return signal from the digital signal processor indicating that output argument data is within the stack memory corresponding to the caller thread. In an aspect, the computing device may further include means for configuring the caller thread to operate in a wait mode in response to transmitting the first signal, means for configuring the caller thread to operate in an active mode in response to receiving the return signal from the digital signal processor, and means for unpacking the output argument data in the stack memory corresponding to the caller thread based on the stub software instructions. In an aspect, the computing device may further include means for unmapping from the local address space the physical memory addresses of the stack memory corresponding to the caller thread in response to transmitting the return signal and based on the skel software instructions. In an aspect, wherein stub software instructions, header data and skel software instructions are generated by performing operations may include means for creating data that describes an interface description language that includes at least one remote procedure call capable of being performed by the service on the digital signal processor, and means for compiling in an interface description language compiler the created data describing the interface description language to generate stub software instructions formatted for execution by the application processor, skel software instructions formatted for execution by the digital signal processor, and header data formatted for compatibility with the application processor. In an aspect, the stub software instructions formatted for execution by the application processor may include high-level programming language code instructions, and the skel software instructions formatted for execution by the digital signal processor may include assembly language code instructions. In an aspect, means for packing argument data in stack memory corresponding to the caller thread based on the stub software instructions may include means for storing constant-size arguments within a single input buffer in the stack memory corresponding to the caller thread, and means for storing pointers that describe physical memory addresses of variable-size argument data structures within a buffer in the stack memory corresponding to the caller thread.

Another aspect may include a computing device that may include a memory, a digital signal processor coupled to the memory, and an application processor coupled to the memory and the digital signal processor, wherein the application processor may be configured with processor-executable instructions to perform operations that may include executing stub software instructions to perform a remote procedure call requested by a caller thread of an application, wherein the remote procedure call is defined in header data associated with the stub software instructions, packing argument data in stack memory corresponding to the caller thread based on the stub software instructions, and transmitting a first signal that instructs the digital signal processor to execute the remote procedure call using physical memory addresses of the packed argument data, and the digital signal processor may be configured with processor-executable instructions to perform operations that may include executing skel software instructions to handle the remote procedure call requested by the caller thread, mapping the physical memory addresses of the packed argument data in the stack memory corresponding to the caller thread to a local address space of the digital signal processor in response to receiving the transmitted first signal and based on the skel software instructions, unpacking the argument data to the local address space based on the skel software instructions, and performing a service associated with the remote procedure call based on the skel software instructions and the unpacked argument data. In an aspect, the application processor may be configured with processor-executable instructions to perform operations that further include transmitting a second signal to the digital signal processor indicating that the stub software instructions are preparing the first signal associated with the remote procedure call, and wherein the digital signal processor may be configured with processor-executable instructions to perform operations that may further include configuring the digital signal processor to execute the skel software instructions and the service related to the remote procedure call based on receiving the second signal. In an aspect, the digital signal processor may be configured with processor-executable instructions to perform operations such that configuring the digital signal processor to execute the skel software instructions and the service related to the remote procedure call based on receiving the second signal may include configuring the digital signal processor to wake from a sleep mode. In an aspect, the digital signal processor may be configured with processor-executable instructions to perform operations such that configuring the digital signal processor to execute the skel software instructions and the service related to the remote procedure call based on receiving the second signal may include configuring the digital signal processor to open a service session related to the remote procedure call. In an aspect, the digital signal processor may be configured with processor-executable instructions to perform operations that may further include packing output argument data in the stack memory corresponding to the caller thread based on the local address space of the digital signal processor and the skel software instructions, and transmitting a return signal indicating that output argument data is within the stack memory corresponding to the caller thread. In an aspect, the application processor may be configured with processor-executable instructions to perform operations that may further include configuring the caller thread to operate in a wait mode in response to transmitting the first signal, configuring the caller thread to operate in an active mode in response to receiving the return signal from the digital signal processor, and unpacking the output argument data in the stack memory corresponding to the caller thread based on the stub software instructions. In an aspect, the digital signal processor may be configured with processor-executable instructions to perform operations that may further include unmapping from the local address space the physical memory addresses of the stack memory corresponding to the caller thread in response to transmitting the return signal and based on the skel software instructions. In an aspect, the application processor may be configured with processor-executable instructions to perform operations that generate stub software instructions, header data and skel software instructions such that generating stub software instructions, header data and skel software instructions that may include creating data that describes an interface description language that includes at least one remote procedure call capable of being performed by the service on the digital signal processor, and compiling in an interface description language compiler the created data describing the interface description language to generate stub software instructions formatted for execution by the application processor, skel software instructions formatted for execution by the digital signal processor, and header data formatted for compatibility with the application processor. In an aspect, the application processor may be configured to execute software instructions that may be high-level programming language code instructions, and the digital signal processor may be configured to execute software instructions that may be assembly language code instructions. In an aspect, the application processor may be configured with processor-executable instructions to perform operations such that packing argument data in stack memory corresponding to the caller thread based on the stub software instructions may include storing constant-size arguments within a single input buffer in the stack memory corresponding to the caller thread, and storing pointers that describe physical memory addresses of variable-size argument data structures within a buffer in the stack memory corresponding to the caller thread.

An aspect may include a non-transitory processor-readable storage medium having stored thereon processor-executable software instructions configured to cause an application processor within a computing device to perform operations that may include executing stub software instructions to perform a remote procedure call requested by a caller thread of an application, wherein the remote procedure call is defined in header data associated with the stub software instructions, packing argument data in stack memory corresponding to the caller thread based on the stub software instructions, and transmitting a first signal that instructs a digital signal processor to execute the remote procedure call using physical memory addresses of the packed argument data, the non-transitory processor-readable storage medium also having stored thereon processor-executable software instructions configured to cause the digital signal processor within the computing device to perform operations that may include executing skel software instructions to handle the remote procedure call requested by the caller thread, mapping the physical memory addresses of the packed argument data in the stack memory corresponding to the caller thread to a local address space of the digital signal processor in response to receiving the transmitted first signal and based on the skel software instructions, unpacking the argument data to the local address space based on the skel software instructions, and performing a service associated with the remote procedure call based on the skel software instructions and the unpacked argument data. In an aspect, the processor-executable software instructions may be configured to cause the application processor within the computing device to perform operations that may further include transmitting a second signal to the digital signal processor indicating that the stub software instructions are preparing the first signal associated with the remote procedure call, and wherein the processor-executable software instructions may be configured to cause the digital signal processor within the computing device to perform operations that may further include configuring the digital signal processor to execute the skel software instructions and the service related to the remote procedure call based on receiving the second signal. In an aspect, the processor-executable software instructions may be configured to cause the digital signal processor within the computing device to perform operations such that configuring the digital signal processor to execute the skel software instructions and the service related to the remote procedure call based on receiving the second signal may include configuring the digital signal processor to wake from a sleep mode. In an aspect, the processor-executable software instructions may be configured to cause the digital signal processor within the computing device to perform operations such that configuring the digital signal processor to execute the skel software instructions and the service related to the remote procedure call based on receiving the second signal may include configuring the digital signal processor to open a service session related to the remote procedure call. In an aspect, the processor-executable software instructions may be configured to cause the digital signal processor within the computing device to perform operations that may further include packing output argument data in the stack memory corresponding to the caller thread based on the local address space of the digital signal processor and the skel software instructions, and transmitting a return signal indicating that output argument data is within the stack memory corresponding to the caller thread. In an aspect, the processor-executable software instructions may be configured to cause the application processor within the computing device to perform operations that may further include configuring the caller thread to operate in a wait mode in response to transmitting the first signal, configuring the caller thread to operate in an active mode in response to receiving the return signal from the digital signal processor, and unpacking the output argument data in the stack memory corresponding to the caller thread based on the stub software instructions. In an aspect, the processor-executable software instructions may be configured to cause the digital signal processor within the computing device to perform operations that may further include unmapping from the local address space the physical memory addresses of the stack memory corresponding to the caller thread in response to transmitting the return signal and based on the skel software instructions. In an aspect, the processor-executable software instructions may be configured to cause the application processor within the computing device to perform operations that generate stub software instructions, header data and skel software instructions such that generating stub software instructions, header data and skel software instructions may include creating data that describes an interface description language that includes at least one remote procedure call capable of being performed by the service on the digital signal processor, and compiling in an interface description language compiler the created data describing the interface description language to generate stub software instructions formatted for execution by the application processor, skel software instructions formatted for execution by the digital signal processor, and header data formatted for compatibility with the application processor. In an aspect, the processor-executable software instructions may be configured to cause the application processor within the computing device to execute software instructions that may include high-level programming language code instructions, and the processor-executable software instructions may be configured to cause the digital signal processor to execute software instructions that may include assembly language code instructions. In an aspect, the processor-executable software instructions may be configured to cause the application processor within the computing device to perform operations such that packing argument data in stack memory corresponding to the caller thread based on the stub software instructions may include storing constant-size arguments within a single input buffer in the stack memory corresponding to the caller thread, and storing pointers that describe physical memory addresses of variable-size argument data structures within a buffer in the stack memory corresponding to the caller thread.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1A:
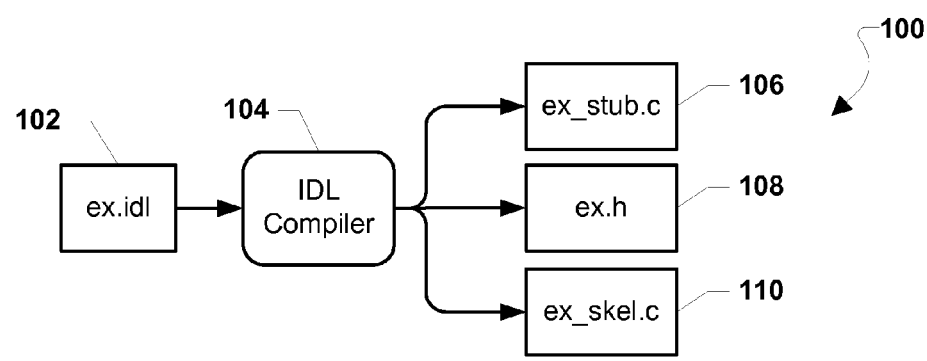
FIG. 1A is a block diagram illustrating an interface description language compiler creating software elements for use by the various processing units.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to any computing device, such as one or all of cellular telephones, smart phones, personal or mobile multi-media players, personal data assistants (PDA's), laptop computers, tablet computers, smart books, palm-top computers, desktop computers, servers, wireless electronic mail receivers, multimedia Internet enabled cellular telephones, and similar personal electronic devices which include a programmable processor, and memory.

The terms "stub," "stub software instructions," or "stub object" are used herein to refer to a software object, set of instructions, functions, or other operations that may be performed by an application processor during execution of an application. Stubs may, at least, convert function calls, marshal resources and arguments, and exchange signals with other software objects. The terms "header" or "header data" are used herein to refer to files or other arrangements of information accessible by an application processor that indicate function names and/or identities which may be executed by the application processor and which also correspond to stub functions. For example, a header may define numerous function names related to a stub object. The terms "skel," "skel software instructions," or "skel object" are used herein to refer to a software object, set of instructions, software, functions, or other operations that may be performed by a digital signal processor in response to signals generated by a stub object. For example, a digital signal processor may execute operations associated with a skel based on signals transmitted from a stub executing on an application processor.

The term "thread" is used herein to refer to any routine, operation, sub-routine, process, or software instructions that are part of an application and executed by an application processor within a computing device. For example, threads may be managed, scheduled, and handled by a high-level operating system executing on an application processor. Threads may be configured to perform individual calculations, functions, and/or procedures related to the application. The terms "stack" or "stack memory" are used herein to refer to a data structure stored within a particular section of memory allocated for use by a thread. In an aspect, a thread's stack may be a segment of the memory allocation for a high-level operating system. Typically, a thread's stack is a last-in-first-out data structure with a limited, predefined size that is determined at the time software instructions that define the thread are compiled by the computing device. For example, a thread's size may be determined at compile time based on the number and types of arguments (e.g., variables, primitives, other data structures, etc.) utilized by the thread. The term "caller thread" is used herein to refer to a thread that is used by the application processor that invokes a remote procedure call and/or interacts with a stub object. For example, a caller thread may invoke a remote procedure call by executing operations defined within a header and related to a compiled stub object.

The various aspects provide methods and devices that facilitate the use of a digital signal processor within a computing device by enabling efficient processing of remote procedure calls invoked by an application executing on an application processor. In general, remote procedure calls may be software commands invoked by software executing on a processor that instruct differently formatted, independent, remote, or otherwise dissimilar processors to perform operations. For example, the application processor executing an application may invoke a remote procedure call that instructs the digital signal processor to execute native services, such as performing mathematical routines (e.g., transforms). Remote procedure calls generated by the various aspect methods may be transparent to various implementations or platforms, and thus may be invoked on processors that utilize different programming languages and protocols. For example, remote procedure calls may be invoked by the application processor configured to use a certain application format (e.g., software programmed in the Java language) in order to instruct the digital signal processor to execute software configured in a different format (e.g., software programmed in the C language). By using remote procedure calls, applications executing on the application processor and software executing on the digital signal processor may not need to be configured according to a common format, programming language, or protocol in order to execute functions and exchange data between the processors.

In the various aspects, the computing device may store an interface description language (or IDL) that defines the functionality of various remote procedure calls. The interface description language may include functions to be used in executing particular applications, such as audio or video processing functions, or alternatively may include broad functionality that may be supplemental to the processes of the application processor. For example, the interface description language may define functions that perform mathematical operations, such as transforms, that may be useful to a particular application executing on the application processor. As another example, the interface description language may define functions that may be employed by any application running on the application processor. The computing device may compile the interface description language using an interface description language compiler that may generate a set of software instructions, or a remote procedure call interface. The remote procedure call interface may be stored, accessed, and utilized by the application processor's high-level operating system (HLOS), as well as the various applications executed by the application processor. For example, the remote procedure call interface may include function calls in the same programming language utilized by applications executing on the application processor.

The remote procedure call interface may be embodied in stub and header software instructions that are formatted for the application processor. For example, if the application processor executes applications programmed in the Java programming language, the stub and header may be formatted in (or be compatible with) the Java programming language. The header may define the function calls of the remote procedure call interface that are available for application executing on the application processor to invoke. For example, an audio rendering application may call a remote procedure call function defined in the header. Remote procedure calls indicated in the header may resemble local application calls or commands and therefore may not require elaborate programming techniques by applications programmers to invoke remote procedure calls. Additionally, the remote procedure call interface may include skel software instructions that are formatted to coincide with the digital signal processor's native instruction configurations. For example, the skel software may be formatted for execution on the operating system of the digital signal processor. In an aspect, the skel software instructions may be assembly language code instructions. The stub and skel may be hosted on their respective processing units as software object files, such as dynamically loaded libraries (DLL's) or statically linked library files.

Remote procedure calls may require the sharing of data between the application processor and the digital signal processor. For example, an application running on the application processor may invoke a remote procedure call with argument data (or arguments) as input, and the digital signal processor may return output argument data in response to performing a native service corresponding to the remote procedure call. When an application executing on the application processor invokes a remote procedure call (e.g., a command formatted as a local call that corresponds to a remote procedure call in the header), the stub object executing on the application processor may detect the use of the remote procedure call and a caller thread may be generated by the high-level operating system of the application processor. The caller thread may be associated with the remote procedure call and may have its own stack memory allocated within the internal memory of the computing device. The stub object may transmit interrupt signals to the digital signal processor indicating that the remote procedure call has been invoked and the physical memory addresses of the stack memory corresponding to the caller thread and the associated remote procedure call arguments. The skel object executing on the digital signal processor may receive the interrupt, map the remote procedure call argument data within the stack memory corresponding to the caller thread to the digital signal processor local address space, and execute a native digital signal processor service that corresponds to the remote procedure call.

In an aspect, the remote procedure call interface may include operations that convert vectors of input buffers and output buffers used by the caller thread executing on the application processor into a single vector for use by the digital signal processor service. In other words, the interface description language compiler may map an arbitrary application's function's arguments into one argument buffer vector. The interface description language compiler may map data such that all argument structures for a particular remote procedure call having constant sizes (or constant-size arguments), such as structs, unions, primitive types, etc., are associated with a single stack-allocated input buffer and output buffer. For example, the interface description language compiler may map primitive data types to the single stack-allocated buffer instead of using a shared memory buffer. For data structures with variable sizes (or variable-size arguments), such as runtime-dependent arguments, the interface description language compiler may include buffers of pointers describing the related application arguments' addresses in memory (and not the actual argument data). The interface description language compiler may append these buffers of pointers to the constant-size arguments buffer to create a single argument buffer vector, which may be reported to the digital signal processor via interrupt signals transmitted by the stub object. Executing the skel software instructions, the digital signal processor may map the reported argument buffer vector into the digital signal processor local address space, thereby reconstructing the original remote procedure call arguments from the argument buffer vector and enabling execution of the requested digital signal processor service or function. As the argument buffer vector data structure is of known size, the interface description language compiler may create a "flattened" data structure with zero copies.

In another aspect, the computing device may find the memory addresses of the physical pages of the caller thread stack used by the argument buffer vector and configure the application processor to avoid swapping out the memory pages. For example, the application processor may configure the high-level operating system not to store data within a particular range of memory coinciding with the caller thread stack. In an aspect, the computing device may relocate the pages of the caller thread stack to different addresses within the memory to avoid overwriting by the application processor's high-level operating system.

In the various aspects, the application processor executing the stub object may generate signals to establish (or open) service sessions on the digital signal processor. A service session may be opened by the digital signal processor prior to receiving interrupts related to an invoked remote procedure call. An open service session may indicate that the digital processor is ready to perform the service to handle related remote procedure calls. The digital signal processor may maintain numerous open service sessions corresponding to applications executing on the application processor, and may close service sessions when receiving interrupts or other signals indicating that the corresponding applications are no longer executing on the application processor. For example, an open service session corresponding to a particular application may be closed by the digital signal processor when the user exits the application. In an aspect, the digital signal processor, via the skel software instructions, may open a service session in response to receiving an interrupt indicating that a remote procedure call may be invoked in the near future. For example, the digital signal processor may open a service session related to a remote procedure call to prepare for handling the remote procedure call. In another aspect, the digital signal processor may emerge from a sleep mode and open a service session in response to receiving a signal regarding a remote procedure call invocation.

By using stub and skel objects, the computing device may avoid making any copies of remote procedure call argument data and the digital signal processor may directly access information stored in the stacks of caller threads associated with invoked remote procedure call functions. In an aspect, the skel object, or alternatively the stub object, may increase memory management efficiency by unmapping any local address space associations made by the skel during execution of a digital signal processor service. For example, any local address spaces utilized to coincide with an invoked remote procedure call may be configured as available for use in subsequent skel operations after the remote procedure call has been executed by the digital signal processor. In an aspect, the digital signal processor may also flush a cache unit in combination with unmapping local address space associations.

In an aspect, stub software executed on the application processor may transmit a signal to the digital signal processor indicating the use of a remote procedure call prior to the invocation of corresponding skel software on the digital signal processor. For example, the application processor may transmit an interrupt signal to the digital signal processor before finishing entering data onto a remote procedure call work queue. In response to receiving such an indication of a future use of the skel software, the digital signal processor may prepare resources for executing a remote procedure call, such as freeing the scheduled process queue of the digital signal processor, opening a service session, and exiting a sleep mode. The digital signal processor may thus be configured to minimize latency and optimize the execution of skel instructions immediately upon receiving remote procedure call interrupts.

In the various aspects, the application processor and the digital signal processor may have access to common data stored within the computing device internal memory. For example, the application processor may store buffer argument data on the stack of a caller thread associated with a remote procedure call function, and the digital signal processor may unpack the data within the buffer in response to receiving a remote procedure call interrupt. However, the various aspect methods do not utilize shared or pre-allocated shared memory, such as in a memory partition managed and utilized by all processors within a computing device. Instead, stack memory corresponding to a caller thread (i.e., caller thread stack memory) may be within sections of the computing device memory that are typically accessible only to the application processor and the high-level operating system running thereon. With the remote procedure call implementation of the various aspect methods, skel software executing on the digital signal processor may access ad hoc memory related to the caller thread invoking the remote procedure call based on physical memory addresses reported by stub software executing on the application processor. Such caller thread stack memory may only include input and output buffers related to the caller thread and may only be accessible between the application processor and the digital signal processor for the duration of the execution of the related remote procedure call.

FIG. 1A illustrates a diagram 100 of an example interface description language compiler 104 (referred to in the diagram as an "IDL" compiler) suitable for creating software elements for use by the various processing units. As described above, the computing device may store an interface description language 102 (e.g., "ex.idl" in the diagram) that defines a set of remote procedure calls or functions that may be invoked by an application executing on an application processor and performed by a digital signal processor. The IDL compiler 104 may compile the interface description language 102 and generate header 108 and stub 106 software instructions (or a stub object) for use by the application processor. Additionally, the IDL compiler 104 may generate skel 110 software instructions (or a skel object) for use by the digital signal processor. The IDL compiler 104 may generate stub 106, skel 110, and header 108 elements such that they present software instructions in numerous configurations and/or programming languages, such as Java, C++, etc. For example, as shown in FIG. 1A, the IDL compiler 104 may generate object files (e.g., .c files) and header files (e.g., .h files) for use with the C programming language. In another aspect, the IDL compiler 104 may generate a skel 110 object compatible with a digital signal processor operating system programmed in one programming language (e.g., Java) and a stub 106 compatible with an application programmed in a different programming language (e.g., C++).

In various aspects, the computing device may store a single interface description language that encompasses all possible services or functions that may be performed by the digital signal processor. In an alternative aspect, the computing device may store a distinct interface description language for different applications that execute on the application processor. For example, the computing device may utilize a first interface description language for an audio application and a second interface description language for a telephony application. In various aspects, numerous interface description language services may include similar operations for the digital signal processor to perform. For example, a first and a second interface description language service may both include a function that instructs the digital signal processor to perform a particular mathematical transform.

In various aspects, the interface description language compiler 104 may be executed on the application processor, the digital signal processor, and/or any other processing unit included within the computing device. For example, the application processor may be configured to execute the IDL compiler 104 to generate any combination of stub software instructions, header data, and/or skel software instructions. As another example, the digital signal processor may be configured to execute the IDL compiler 104 to generate any combination of stub software instructions, header data, and/or skel software instructions.

Figure 1B:
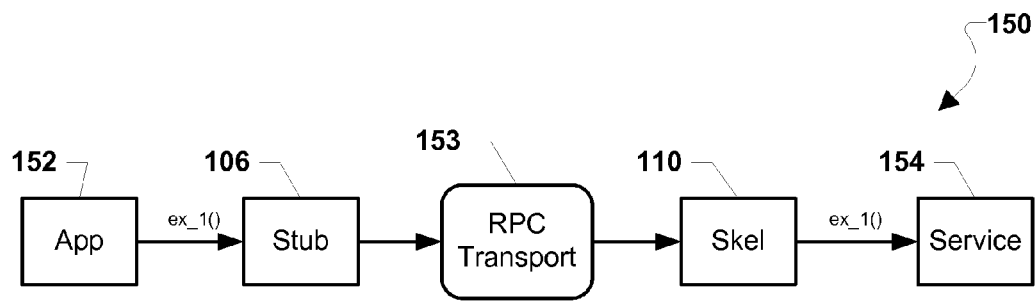
FIG. 1B is a block diagram illustrating a communications path from an application processor to a digital signal processor based on predefined generated interface description language compiler software instructions.

FIG. 1B illustrates an operational path 150 from an application 152 executing on an application processor to a service 154 performed by a digital signal processor. The application processor may execute various routines and/or an application 152 using a high-level operating system. Examples of applications 152 that may be executed include video streaming applications, audio editing software, spreadsheet/text management applications, etc. The application processor may determine when a currently-executing application 152 invokes a function, system call, or software routine that is associated with a predefined remote procedure call. For example, the application 152 may invoke a "ex_1( )" that is defined in a header file generated by the interface description language compiler and stored for use by the application processor. The remote procedure call may be formatted or written in the same programming language as the executing application and the high-level operating system of the application processor. The stub 106 object may detect and handle the remote procedure call invoked by the application 152. Based on various determinations and arguments packaging by the stub 106, a transport component 153 may relay an argument buffer vector for handling by the skel 110 object executing on the digital signal processor. The skel 110 may map the arguments memory into the local digital signal processor address space, unpack the remote procedure call arguments, and determine the corresponding native service 154 available for execution within the digital signal processor. For example, the skel 110 object may determine particular software instructions to execute based on a stored library that relates the transported argument buffer vector to the service 154. In an aspect, the service 154 may be a computation or other routine that may require input and/or output information from the application 152. For example, the remote procedure call may invoke a digital signal processor service 154 that performs a calculation using values generated by the application 152 and places a result, or output argument data, in the output buffer within the caller thread stack.

Figure 2:
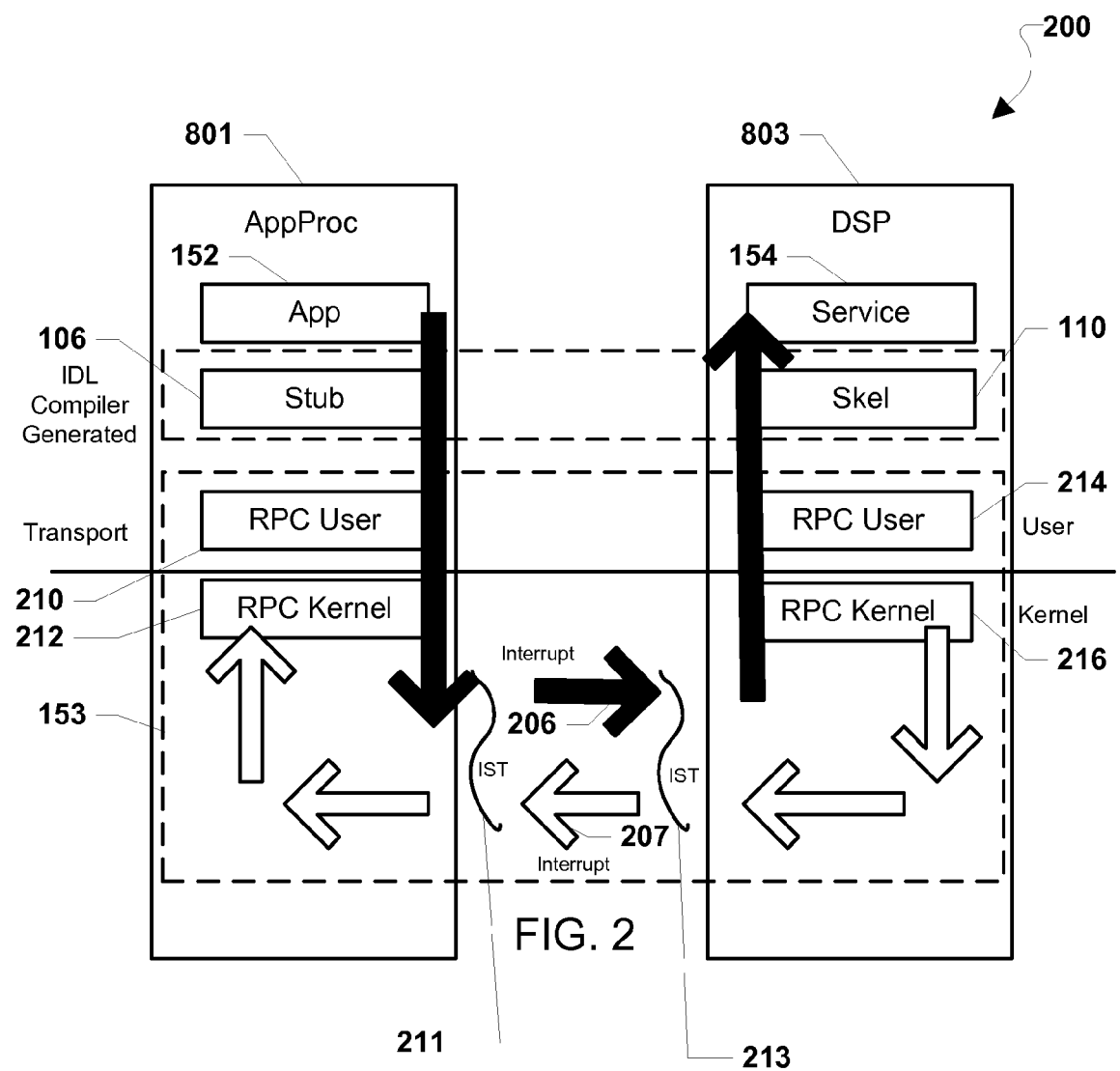
FIG. 2 is a block component diagram illustrating signals regarding a remote procedure call exchanged between an application processor running a high-level operating system and a digital signal processor according to an aspect.

FIG. 2 illustrates an example flow 200 of a remote procedure call from an application processor 801 (referred to as an "AppProc" in the diagrams) to a digital signal processor 803 (referred to as a "DSP" in the diagram). Elements generated by the interface description language compiler may include stub 106 and skel 110 software instructions or objects utilized by the application processor 801 and the digital signal processor 803 respectively. In an aspect, the interface description language compiler may be replaced by a third-party compiler that is configured and capable of generating stub, skel and header software instructions that may enable remote procedure calls between the processing units.

After an application 152 invokes a remote procedure call defined within an interface description language, the stub 106 object may marshal the memory required for the remote procedure call, consolidating the remote procedure call arguments into a single vector, as described above. The stub 106 object may instruct transport elements of the high-level operating system using a transport component 153 of the application processor, that may include components such as the remote procedure call user component 210 and the remote procedure call kernel component 212, to relay the remote procedure call information from the application processor to the digital signal processor 803. In an aspect, the transport component 153 and its functionality may be implemented over any protocol that already exists between the application processor and the digital signal processor. The stub 106 object may initiate the transmission of an interrupt 206 signal that may be received by the digital signal processor 803. The application executing on the application processor may enter a sleep (or wait) mode based on transmitting the interrupt 206 signal.

The interrupt 206 is received by components of the digital signal processor 803, such as an interrupt service routine 213, RPC Kernel 216 and RPC User 214. In particular, the interrupt service routine 213 (referred to as "IST" in FIG. 2) may be an operating system component for handling hardware interrupts and may typically be used to do heavyweight processing of interrupts. For example, the digital signal processor 803 may avoid entering a special interrupt processing mode by employing the dedicated interrupt service routine 213. The skel 110 object may map the remote procedure call arguments memory shared addresses into the local digital signal processor 803 memory space and perform the native functions for the service 154 related to the remote procedure call. The skel 110 object may transport a return transmission, such as an interrupt message 207, which may indicate output data within the caller thread stack memory. An interrupt service routine 211 executing on the application processor 801 may receive the interrupt message 207. In an aspect, the interrupt message 207 may also instruct the waiting/sleeping application 152 to resume active execution on the application processor 801.

As described below with reference to FIG. 4, to establish an on-going connection with the service 154 available on the digital signal processor 803, the stub 106 object executed by the application processor 801 may open a service session (or "open the service") upon initialization (e.g., at load time) of the application. For example, at load time on the application processor, the application 152 may transmit a signal to the digital signal processor 803 that instructs the opening of the service related to a remote procedure call, or alternatively an interface description language. With an established (or open) service 154 session, the application 152 may continually transport service requests as remote procedure calls to the digital signal processor 803 with minimized latency.

Figure 3:
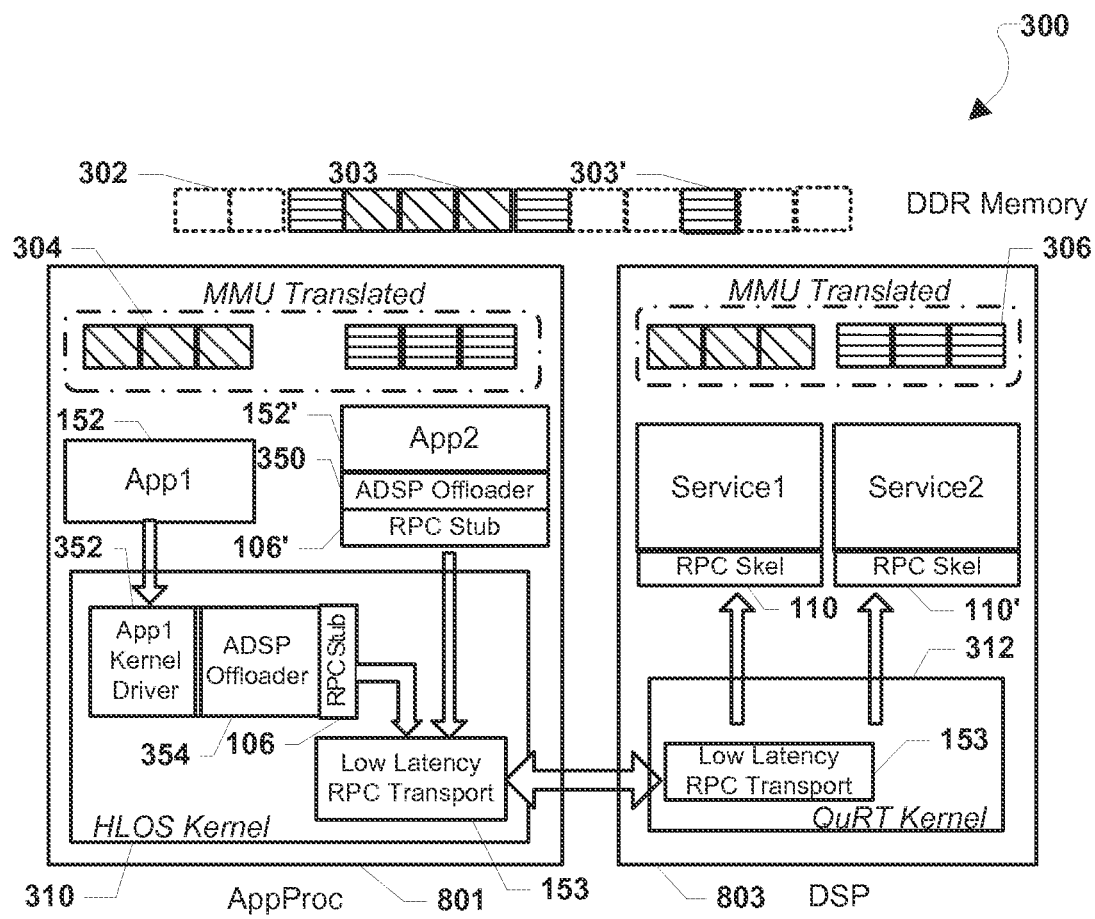
FIG. 3 is a block diagram illustrating an application processor and a digital signal processor configured to access data stored within a system memory unit according to an aspect.

FIG. 3 illustrates a block diagram 300 of an application processor 801 and a digital signal processor 803, each configured to access data stored within a system memory 302. As described above, the application processor 801 may execute numerous applications, such as App1 152 and App2 152', and may manage the various applications 152, 152' with a high-level operating system 310 (referred to as "HLOS" in FIG. 3). The various applications 152, 152' executed within the application processor 801 may utilize respective stub 106, 106' objects to execute remote procedure calls that include arguments utilizing memory locations/addresses within system memory 302. In an aspect, the applications 152, 152' may store argument data for remote procedure calls in contiguous blocks of physical memory addresses 303 or in scattered arrangements of physical memory addresses 303' of the system memory 302. For example, caller thread stacks associated with the applications 152, 152' may be stored in the memory 302. The applications 152, 152' may have application-local mappings 304 of the physical addresses of the memory, such as through virtual address schemes well known in the art. In an aspect, the application processor 801 may also utilize an offloader components 350, 354 and an application kernel driver 352.

Each application 152, 152' may employ the stub 106, 106' objects to instruct the transport component 153 to transmit interrupts received by the digital signal processor 803 operating system 312 (referred to as "QuRT" in FIG. 3). In an aspect, the transport component 153 may enable low latency argument data transfers as the stub 106, 106' objects may not copy and transmit remote procedure call arguments, instead only transmitting memory address information. For example, the transport component 153 may indicate to skel 110, 110' objects the physical memory addresses of the system memory 302 that correspond to a caller thread stack of the application 152. Once the skel 110, 110' objects on the digital signal processor 803 receive the various remote procedure call signals, the skel 110, 110' objects may remap the provided physical memory addresses of the system memory 302 to correspond to local memory mapping 306 schemes used by the digital signal processor 803.

Figure 4:
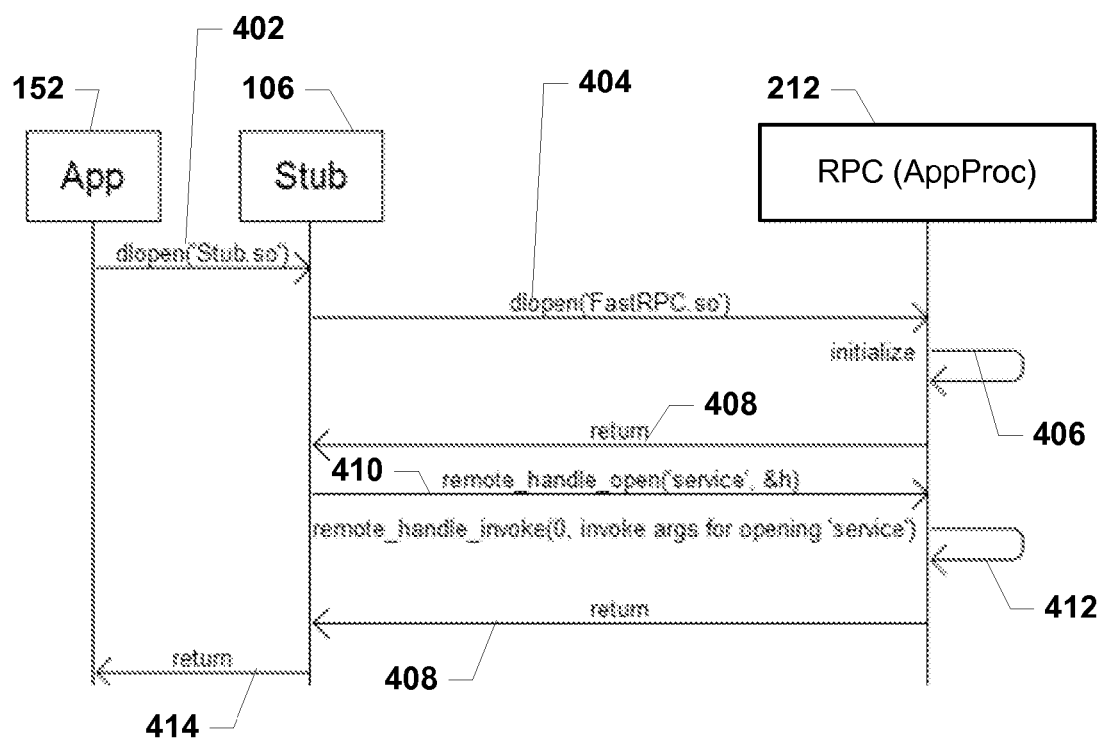
FIG. 4 is a signal call flow diagram of an application processor opening a service session for use with an application configured to invoke a remote procedure call according to an aspect.

FIG. 4 illustrates a signal call flow 500 of an application processor opening a service session for use with an application 152 configured to invoke a remote procedure call. In general, the application processor may establish (or open) a remote procedure call service session when the application 152 is loaded or initialized for use. For example, when an audio application 152 first begins executing on the application processor, the application 152 may initiate the remote procedure call service session. The application 152 may be configured to initialize the remote procedure call service session by calling an open function 402, which is processed by a stub 106. Based on the application's open function 402, the stub 106 may execute a command 404 that directs the remote procedure call kernel component 212 (or remote procedure call driver) to transmit an interrupt 406 (i.e., remote procedure call service session open signal) to the digital signal processor instructing the service session to be opened by a skel object executing on the digital signal processor. As described below, the application processor may transmit interrupt signals to inform the digital signal processor that remote procedure call functions are invoked or about to be invoked, giving the digital signal processor an opportunity to wake from a sleep mode, marshal computing resources, or re-schedule other pending operations unrelated to the pending remote procedure call.

The remote procedure call kernel component 212 may transmit a return signal 408 to the stub 106 object, confirming transmission of the initialization interrupt 406 or alternatively, confirming the successful opening of the service session as indicated by a response signal from the digital signal processor (not shown). The stub 106 object may also transmit a remote procedure call handle open function 410 to be executed by the digital signal processor. The digital signal processor may return to the remote procedure call kernel component 212 a remote procedure call handle invoke function 412, which may be relayed to the stub 106 object via another return signal 408 so that the stub 106 object may identify any returned arguments from the digital signal processor transmitted in response to opening the service. The stub 106 object may also transmit a return signal 414 to the application 152. In an aspect, there may be multiple service invocations while the application 152 is executing on the application processor. For example, once the remote procedure call service session is opened, the application 152 may call many remote procedure call functions associated with the service multiple times. In another aspect, the remote procedure call service may remain open until the digital signal processor receives a remote procedure call service session close signal from the stub 106 object.

Figure 5:
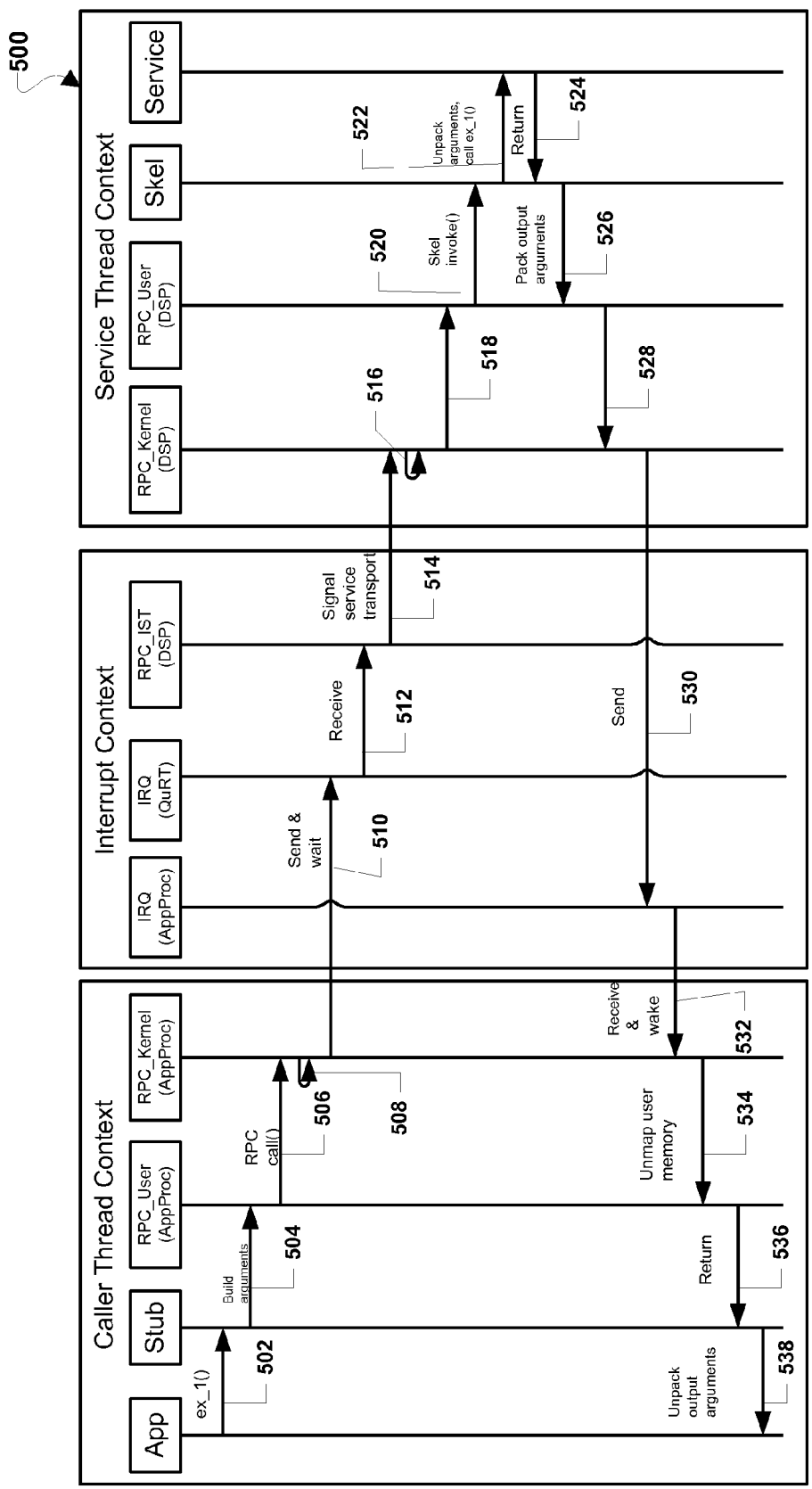
FIG. 5 is a signal call flow diagram illustrating a remote procedure call between an application processor and a digital signal processor according to an aspect.

FIG. 5 illustrates an exemplary signal call flow 500 regarding a remote procedure call between an application processor and a digital signal processor. In general, an application executing on the application processor may be configured to perform a function that is associated with a remote procedure call. When a stub object, generated by an interface description language compiler and executing on the application processor, detects the function on the call stack of a caller thread, the stub object may initiate execution of a remote procedure call and trigger a skel object's performance of operations associated with the function on the digital signal processor.

Once the remote procedure call service running on the digital signal processor has been established, the application may call a function 502 (e.g., "ex_1( )") that is detected by the stub object. In response to the function 502, the stub object may build (or pack) arguments 504 relevant for the associated remote procedure call into a caller thread stack, delivering the arguments 504 to a remote procedure call user component, which may transmit a signal 506 to a remote procedure call kernel component. In an aspect, the remote procedure call user and remote procedure call kernel components may be particular modules within the high-level operating system executing on the application processor. The remote procedure call kernel component may gather user pages of memory and enqueue instructions regarding the remote procedure call 508 for a subsequent reporting to the digital signal processor. The application processor via the remote procedure call kernel may transmit an interrupt signal 510 that indicates the remote procedure call and packed arguments, which may initiate an interrupt request signal 512 received by an interrupt handler at the digital signal processor. A signal service transport message 514 may be transmitted to the digital signal processor's operating system (or kernel), which may detect the remote procedure call (or invocation) from the queue and map physical memory addresses 516 related to the remote procedure call arguments into local space relevant for the digital signal processor. The digital signal processor kernel component may relay the remote procedure call and associated arguments 518 to the remote procedure call user component of the digital signal processor which may in turn signal an invocation 520 of the skel object. The skel object may unpack argument buffer vectors and call the associated service function to perform remote procedure call operations 522 related to the remote procedure call.

The service function executed by the digital signal processor may return output information 524 from the operations related to the remote procedure call, and the skel object may pack the output arguments 526. The remote procedure call user component running on the digital signal processor kernel may relay the output return as a signal 528 to the remote procedure call kernel component, which may transmit an interrupt request message 530 to the interrupt handler of the application processor. In response to receiving the interrupt request, the interrupt handler may transmit a wake signal 532 to the remote procedure call kernel component of the application processor which may unmap the user memory 534 associated with the remote procedure call and the digital signal processor. For example, the application processor remote procedure call kernel may unmap any local address space associations (or "mappings") the digital signal processor made in response to receiving information from the stub object indicating physical memory addresses related to an argument buffer vector. The remote procedure call user component of the application processor may transmit a return signal 536 to the stub object, indicating the remote procedure call function has been executed by the digital signal processor, and in response, the stub object may unpack any output arguments 538 for use by the application.

Figure 6:
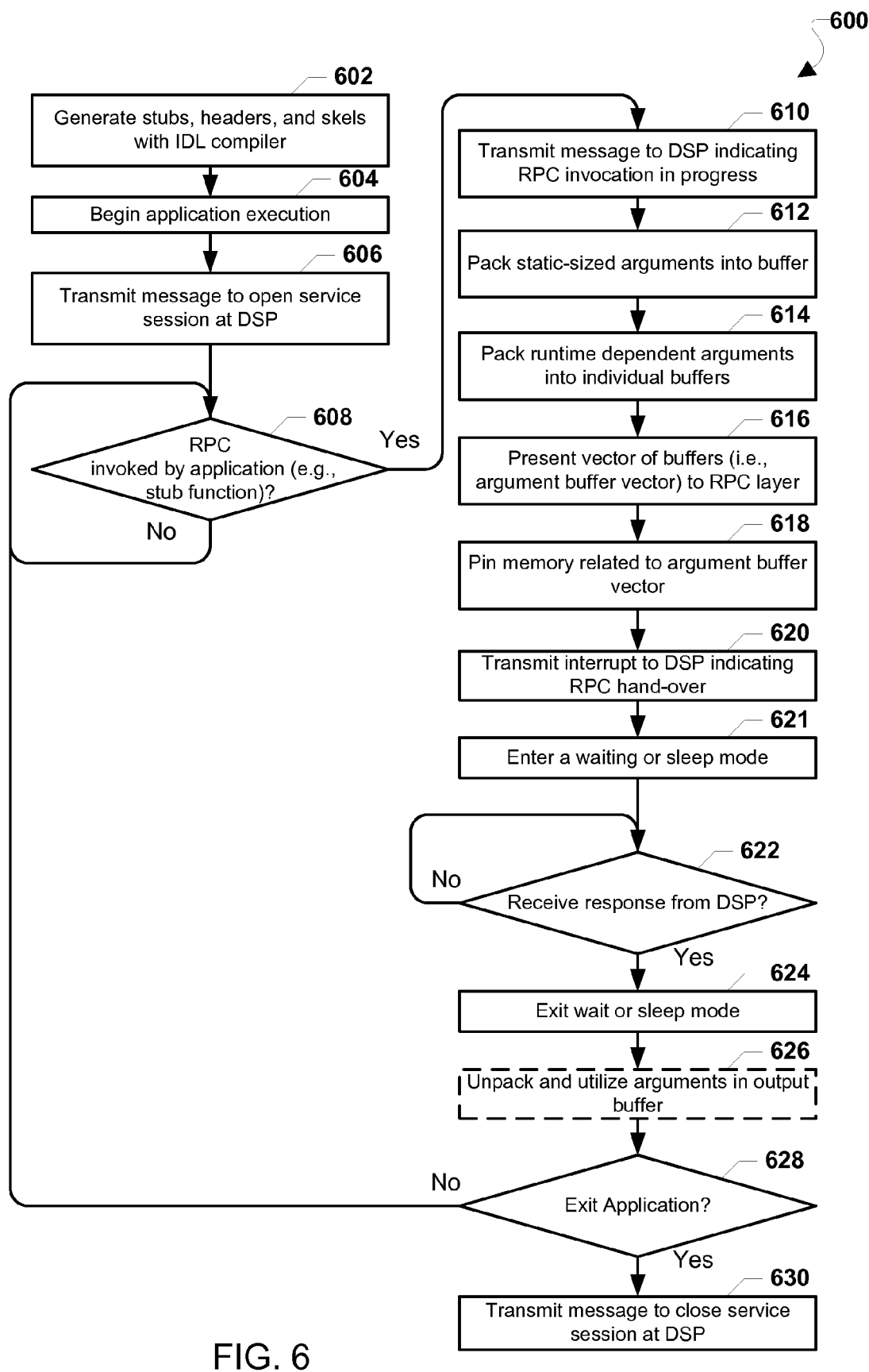
FIG. 6 is a process flow diagram illustrating an aspect method for invoking a remote procedure call by an application processor within a computing device.

FIG. 6 illustrates an aspect method 600 for invoking a remote procedure call by an application processor within a computing device. As described above, the application processor may execute simultaneous software, including a high-level operating system, various applications, and stub objects generated as described below. To share computation expenses and increase efficiency, the application processor may utilize stub objects to transport various operations to a digital signal processor via remote procedure calls. In the operations described below with reference to blocks 610-626, the actions ascribed to the application processor may be equally assumed to be performed by software executing on the application processor, such as stub objects or applications (e.g., an audio rendering application).

In block 602, the application processor may generate stubs, headers, and skels with an interface description language compiler. For example, the computing device may store a predefined interface description language that indicates a suite of functions that may be called by the application processor as local calls and that the digital signal processor may perform as a local or native service. In an aspect, the interface description language compiler may be performed by the application processor, the digital signal processor, and/or any other processing unit within the computing device. The interface description language compiler may convert the interface description language into a library, such as a dynamically loaded library ("dll"), that includes functions the application processor may utilize. The library may indicate the amount of memory required or allocated for a thread that may perform a function within the interface description language. For example, the library may define that a thread for executing a function "ex_1( )" may require a certain number of kilobytes of system memory. The interface description language compiler may additionally create a library or reference information for use by the digital signal processor that defines functions and services that may be performed by the digital signal processor. As described above, the stub objects and headers may be generated and compiled based on a particular programming language, such as Java, C, or C++, and the libraries or services for use on the digital signal processor may be compiled to utilize a different programming language or syntax.

In block 604, the application processor may begin to execute an application. For example, the application processor may begin performing operations of a median application, such as an audio player (e.g., mp3 app). During the performance of the application, the application processor may utilize files, configuration information, system variables, and other data, information, routines, and sub-routines stored on the computing device. For example, the application processor may access an mp3 audio file while performing operations for the audio application referenced above. Additionally, numerous threads may be executed in the process of executing the application on the application processor. For example, the application processor may execute individual threads for various function calls related to the application. As described above, each thread may utilize a thread stack in memory, in which arguments are stored, such as variables required for particular operations and/or output data buffers for the operations' results.

In block 606, the application processor may transmit a signal to the digital signal processor instructing the initialization or opening of a particular remote procedure call service session (i.e., a remote procedure call service session open signal). For example, the application processor may transmit an interrupt signal via the stub object that instructs the skel object executing on the digital signal processor to begin a particular service session. As another example, the application processor may indicate to the digital signal processor that a service related to supplementary computations should be initialized when the application processor begins executing an audio application. The signal may instruct the digital signal processor to configure an open service session that coincides with the execution of the application and that may continue to remain an open service until the application processor discontinues execution of the application. In other words, the service for a particular application performed by the application processor may be open while the application is actively performed.

In determination block 608, the application processor may determine whether the executing application invokes a function that corresponds to a remote procedure call function defined within the header. For example, the application processor, via the executing stub object, may continually compare the function names of executing operations on the application processor to the library or list of function names generated by the interface description language compiler as described above. If the application processor determines that a remote procedure call is not invoked (i.e., determination block 608="No"), the application processor may continue to evaluate the execution of the application in determination block 608.

If the application processor determines that a remote procedure call is invoked (i.e., determination block 608="Yes"), in block 610 the application processor may transmit a signal to the digital signal processor indicating the invocation of a particular remote procedure call has been initiated. The digital signal processor may operate in a sleep mode when the application processor is not actively employing the digital signal processor. For example, for a period of time, the application processor may not execute applications that require supplementary computations by the digital signal processor and/or may not be configured to utilize the services defined within a compiled interface description language. In such an inactive state, the digital signal processor may not be configured to execute operations immediately and may require a preparation period in which it may become energized or otherwise ready to execute operations associated with an open service.

As described above, a caller thread may be utilized by the application processor to perform the operations of the remote procedure call. In block 612, the application processor may pack static-sized arguments into a buffer associated with the caller thread. For example, at the time of compiling, the interface description language compiler may indicate a particular range of physical memory addresses that may be used to store static arguments, such as integer arguments, for remote procedure calls invoked by the application. In block 614, the application processor may pack runtime dependent arguments into individual buffer data structures. Certain functions associated with remote procedure calls may be variable-size and require more complex data structures or information to be utilized by the digital signal processor to produce output information useful to the application processor. Such data structures may require storage of variable size and thus may not have caller thread stack allocations made at compile time by the interface description language compiler. Instead, the application processor may indicate these arguments as individual buffers to accommodate the variable sizes. In block 616, the application processor may organize the static-sized arguments buffer and the individual buffers for the runtime dependent arguments into a single argument buffer vector data structure and may indicate that vector to the remote procedure call transport routine.

In block 618, the application processor may pin (or stabilize) the memory related to the argument buffer vector. To allow the digital signal processor to utilize the caller thread stack data and therefore not induce the application processor into creating copies, the computing device must be configured to prevent subsequent memory allocations or write procedures from overwriting the stack memory. In an aspect, the pinning of memory may be accomplished by the application processor, or any other memory management component within the computing device, by storing a data table of physical memory addresses corresponding to the caller thread and the argument buffer vector and indicating that these addresses are unavailable for write procedures. In another aspect, the various physical memory addresses associated with the argument buffer vector may be flagged or otherwise demarcated as being temporarily unavailable for use by other applications.

In block 620, the application processor may transmit an interrupt signal to the skel object of the digital signal processor indicating that a particular service associated with the remote procedure call should be executed. For example, the application processor may transmit an interrupt instructing the digital signal processor to perform skel instructions in response to marshaling the arguments in the argument buffer vector. In block 621, the application processor may configure the caller thread associated with the remote procedure call to operate in a sleep (or wait) mode during which the application processor does not perform any instructions or functionality of the caller thread. For example, the caller thread related to an audio application may be configured to cease rendering audio data and listen for a response signal from the digital signal processor. In determination block 622, the application processor may determine whether a response signal is received from the digital signal processor. For example, the application processor may receive a signal from the digital signal processor via the skel object that indicates a remote procedure call has been executed and output data is available for use by the caller thread. If the application processor does not receive a response from the digital signal processor (i.e., determination block 622="No"), the application processor may continue to listen in determination block 622. However, if the application processor does receive a response from the digital signal processor (i.e., determination block 622="Yes"), in block 624 the application processor may configure the caller thread to exit the sleep mode and discontinue listening for a response signal from the digital signal processor related to the remote procedure call. For example, the caller thread may be configured to operate in "active" mode.

In optional block 626, the application processor may unpack and utilize output arguments in the caller thread stack that the digital signal processor generated in response to performing the operations of the service associated with the remote procedure call. For example, the application processor may retrieve integer values from the caller thread stack which may be used by the caller thread to continue performing the application. In determination block 628, the application processor may determine whether the application has ended (e.g., the user has terminated the app running on the computing device). If the application has ended (i.e., determination block 628="Yes"), in block 630 the application processor may transmit a signal to the digital signal processor indicating that the application has closed and instructing the digital signal processor to close the remote procedure call service session. If the application has not ended (i.e., determination block 628="No"), the application processor may continue with the operations in determination block 608.

Figure 7:
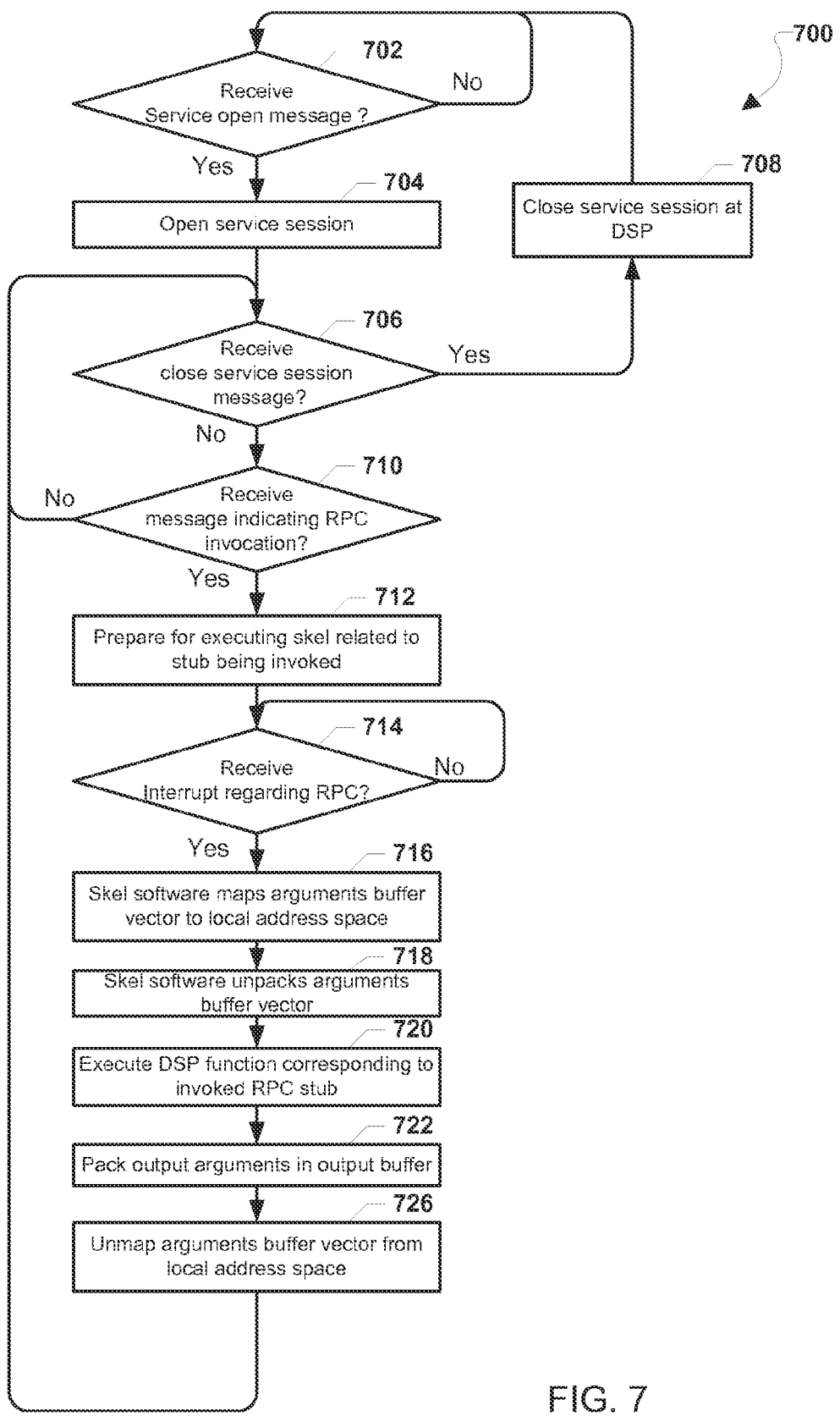
FIG. 7 is a process flow diagram illustrating an aspect method for performing a service associated with a remote procedure call by a digital signal processor within a computing device.

FIG. 7 illustrates an aspect method 700 for performing a service associated with a remote procedure call by a digital signal processor within a computing device. The method 700 may include companion operations to the operations described above with reference to FIG. 6. For example, the digital signal processor operations in method 700 may be performed in response to and in combination with the operations executed by an application processor in method 600.

In general, the digital signal processor may receive requests to perform operations for the application processor in addition to the native functions the digital signal processor executes. As described above, the digital signal processor may utilize a native instruction set and functionality that is dissimilar to the application processor, and may also not share a pre-allocated memory with the application processor. For example, the digital signal processor and the application processor may each typically utilize respective portions of an internal memory unit and therefore may not have access to the other processor's range of memory. However, with the method 700 (along with method 600), the digital signal processor may be given access to the physical memory addresses (e.g., a caller thread's stack) with which the digital signal processor may access and write values.

In determination block 702, the digital signal processor may determine whether a signal instructing the opening of a remote procedure call service session (i.e., a remote procedure call service session open signal) has been received from the application processor. For example, the digital signal processor may periodically evaluate communication channels and associated buffers between the application processor and the digital signal processor to identify signals regarding remote procedure call service sessions. In an aspect, any signals regarding remote procedure call services may be stored temporarily when the digital signal processor is not immediately available to process such signals from the application processor.

If the digital signal processor receives a remote procedure call service session open signal (i.e., determination block 702="Yes"), in block 704, the digital signal processor may configure a service session to be open for receiving and processing subsequent remote procedure calls requested by the application processor. If the digital signal processor does not receive a remote procedure call service session open signal (i.e., determination block 702="No"), the digital signal processor may continue to listen for remote procedure call service session open signals in determination block 702. In an aspect, the digital signal processor may open (and close) multiple simultaneous remote procedure call service sessions and each remote procedure call service session may correspond to a particular application executing on the application processor. In an aspect, multiple applications executing on the application processor may utilize the same service(s) on the digital signal processor. For example, an audio application and a communications application executing on the application processor may both utilize a particular service on the digital signal processor.

In determination block 706, the digital signal processor may determine whether a signal instructing the close of a remote procedure call service session is received (i.e., remote procedure call service session close signal). Similar to the signal instructing the digital signal processor to open a remote procedure call service session, the digital signal processor may receive a remote procedure call service session close signal from the application processor indicating that an open remote procedure call service session should be closed. For example, a particular service may be opened by the digital signal processor based on the execution of a particular application on the application processor, but may also be closed based on the user of the computing device exiting the application. If the digital signal processor receives a remote procedure call service session close signal (i.e., determination block 706=Yes"), in block 708 the digital signal processor may configure the appropriate service session to be closed and may continue to receive service session open signals in determination block 702.

However, if the digital signal processor does not receive a remote procedure call service session close signal (i.e., determination block 706="No"), in determination block 710 the digital signal processor may determine whether it receives a signal indicating that a particular remote procedure call associated with the open remote procedure call service session is in the process of being invoked by the application processor. For example, the digital signal processor may receive a signal indicating that the stub object executing on the application processor is packing arguments related to a particular remote procedure call which will be invoked for the execution by the digital signal processor. If the digital signal processor does not receive any indication or signal that a particular remote procedure call is being invoked (i.e., determination block 710="No"), the digital signal processor may continue with the operations in determination block 706. If the digital signal processor does receive an indication that a particular remote procedure call is being invoked by the application processor (i.e., determination block 710="Yes"), in block 712 the digital signal processor may prepare for executing the skel software instructions related to the remote procedure call indicated by the signal received in the operations of determination block 710. For example, the digital signal processor may be configured to be in an active mode, to begin freeing resources, to schedule other operations for a later time, and additional operations that may increase the digital signal processor's ability to efficiently and immediately process the remote procedure call indicated in the signal received in the operations of determination block 710.

In determination block 714, the digital signal processor may determine whether an interrupt signal is received indicating the remote procedure call has been invoked by the application processor. In other words, the signal may indicate that the skel software instructions may be executed to process the remote procedure call on the digital signal processor. While the digital signal processor does not receive the signal indicating the skel object may be executed to process the remote procedure call (i.e., determination block 714="No"), the digital signal processor may continue to listen in determination block 714. If the digital signal processor receives an interrupt indicating the remote procedure call stub instructions have been executed by the application and the coinciding skel operations may be executed by the digital signal processor (i.e., determination block 714="yes"), in block 716 the digital signal processor may begin executing the skel operations by mapping the arguments buffer vector to the local address space of the digital signal processor. As described above, a caller thread executing on the application processor may utilize a stack data structure that stores data in physical memory allocated for the caller thread. Although the application processor (and the caller thread) and the digital signal processor may utilize the same memory unit, each may utilize different mappings to the various locations within the memory unit. For example, the application processor and digital signal processor may access non-contiguous blocks of memory as allocated by their respective memory management units, as described above with reference to FIG. 3. The skel object executed by the digital signal processor may convert the caller thread's physical memory addresses for the various arguments related to the remote procedure call into local address space addresses that are known and accessible to the digital signal processor's memory management unit. In block 718, the digital signal processor via the skel object may unpack the arguments buffer vector, including determining data structures with sizes defined at runtime. For example, the remote procedure call may include a reference to a linked-list of indeterminate size, which may be determined at the time of skel operations execution based on the information within a remote procedure call argument buffer vector. In general, unpacking arguments may include unmarshalling data that has been marshaled by the application processor via the stub object for communication with the digital signal processor. For example, the various data and information represented within the argument buffer vector may be combined by the application processor via marshalling operations and separated by the digital signal processor via unmarshalling operations. Unmarshalled data may be used by the digital signal processor.

In block 720, based on the skel object and the compiled remote procedure call library, the digital signal processor may execute a function corresponding to the service indicated by the stub object. For example, the skel object executing on the digital signal processor may indicate that, based on a received interrupt signal from the stub object executing on the application processor, the digital signal processor may execute a particular native function associated with the interrupt and defined within the service library. As another example, the application running on the application processor may invoke a function (e.g., "ex_1( )" that may correspond to a remote procedure call that results in the digital signal processor executing a service (e.g., the digital signal processor may perform the native operations for ex_1( )). The digital signal processor may compute, execute, and otherwise perform operations as defined by the service library and indicated by the skel object in response to receiving the interrupt signal.

In block 722, the digital signal processor via the skel object may pack arguments back within the caller thread's stack based on the mapped local address space information. For example, the digital signal processor may perform a mathematical service in response to receiving the remote procedure call interrupt signal generated by the application processor, and may place the result value of the mathematical function in the output buffer of the associated caller thread's stack. As described above, the digital signal processor may store, or pack, any output information and data into the caller thread's stack without copying any data. In other words, the only memory location to store the result of the digital signal processor's service in response to receiving the remote procedure call interrupt signal may be the caller thread's stack.

In block 726, the digital signal processor may unmap the arguments buffer vector from the local address space at the conclusion of executing the service related to the remote procedure call. In particular, the digital signal processor may free or de-allocate any local address space memory locations so that subsequent remote procedure calls or other digital signal processor memory accesses may utilize the local memory address locations used in relation to processing the remote procedure call. The digital signal processor may continue with the operations in determination block 706.

Figure 8:
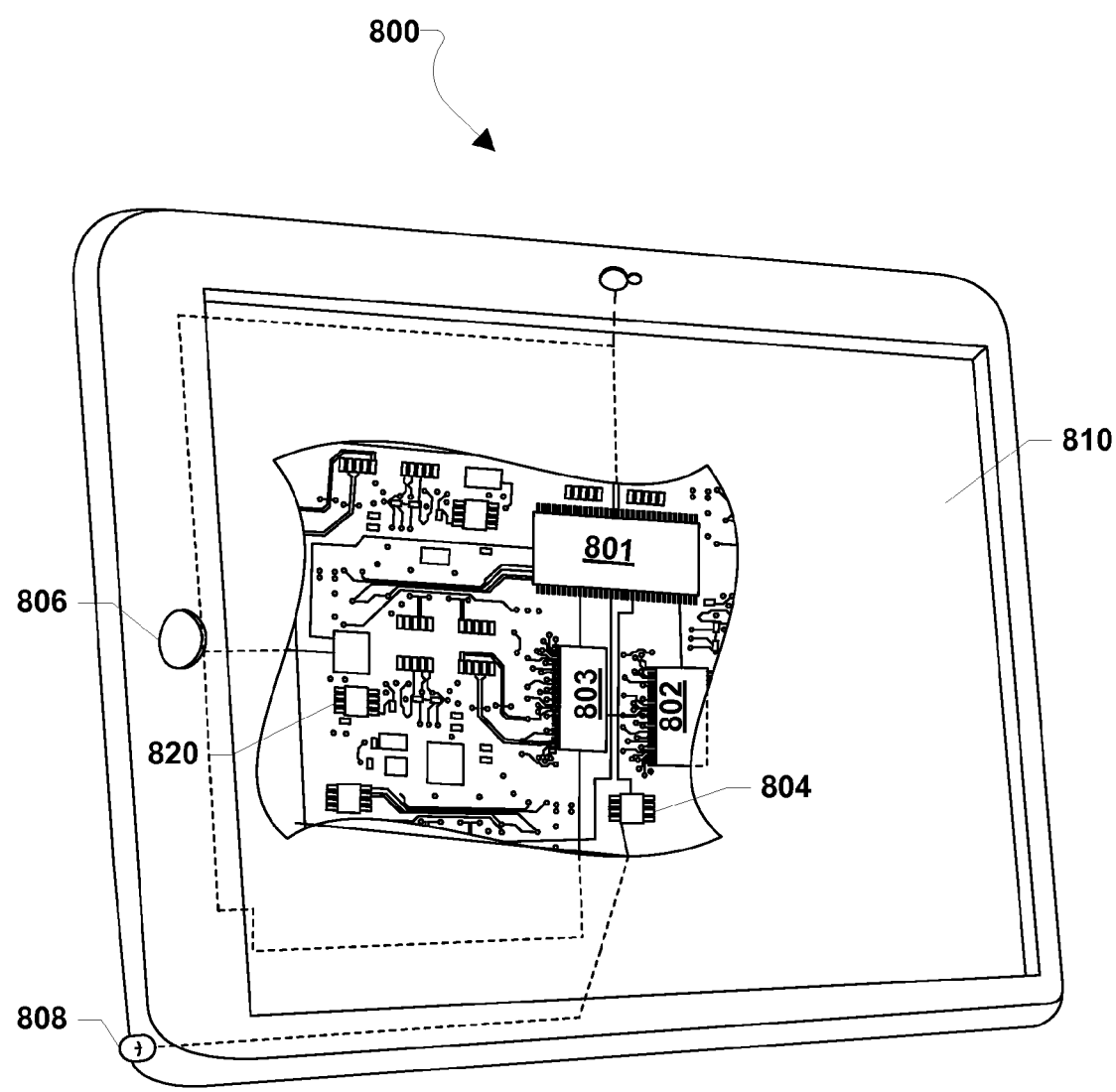
FIG. 8 is a component block diagram of an example wireless computing device suitable for use with the various aspects.

The various aspects may be implemented in any of a variety of computing devices, an example of which in the form of a tablet computer is illustrated in FIG. 8. A computing device 800 may include a digital signal processor 803 and a processor 801 coupled to internal memory 802. The internal memory 802 may be volatile or non-volatile memory, and may also be secure and/or encrypted memory, or unsecure and/or unencrypted memory, or any combination thereof. The digital signal processor 803 and processor 801 may also be coupled to a touchscreen display 810, such as a resistive-sensing touchscreen, capacitive-sensing touchscreen infrared sensing touchscreen, etc. The tablet device 800 may have one or more short-range radio signal transceivers 804 (e.g., Peanut®, Bluetooth®, Zigbee®, RF radio) and antennas 808 for sending and receiving wireless signals as described herein. The transceivers 804 and antennas 808 may be used with the above-mentioned circuitry to implement the various wireless transmission protocol stacks and interfaces. The tablet device 800 may include a cellular network wireless modem chip 820 that enables communication via a cellular network. The tablet device 800 may also include a physical button 806 for receiving user inputs.

The processors 801 and 803 may be any programmable microprocessor, microcomputer or multiple processor chip or chips that can be configured by software instructions (i.e., applications) to perform a variety of functions, including the functions of the various aspects described above. In some devices, multiple processors may be provided, such as one processor dedicated to wireless communication functions and one processor dedicated to running other applications. Typically, software applications may be stored in the internal memory 802 before they are accessed and loaded into the processors 801 and 803. The processors 801 and 803 may include internal memory sufficient to store the application software instructions. In many devices the internal memory may be a volatile or nonvolatile memory, such as flash memory, or a mixture of both. For the purposes of this description, a general reference to memory refers to memory accessible by the processors 801 and 803 including internal memory or removable memory plugged into the device and memory within the processors 801 and 803.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (digital signal processor), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a digital signal processor and a microprocessor, a plurality of microprocessors, one or more microprocessors in conjunction with a digital signal processor core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for performing remote procedure calls within a computing device between a digital signal processor and an application processor executing an application, comprising:
    executing stub software instructions on the application processor to perform a remote procedure call requested by a caller thread of the application, wherein the remote procedure call is defined in header data associated with the stub software instructions;
    executing skel software instructions on the digital signal processor to handle the remote procedure call requested by the caller thread;
    packing argument data in stack memory corresponding to the caller thread based on the stub software instructions by:
        organizing constant-size arguments and variable-size argument data structures of the argument data into a single argument buffer vector data structure; and
        pinning memory related to the single argument buffer vector data structure in the stack memory corresponding to the caller thread;
    transmitting a first signal from the application processor that instructs the digital signal processor to execute the remote procedure call using physical memory addresses of the packed argument data;
    mapping the physical memory addresses of the packed argument data in the stack memory corresponding to the caller thread to a local address space of the digital signal processor in response to receiving the transmitted first signal and based on the skel software instructions;
    unpacking the argument data to the local address space from the stack memory by the digital signal processor based on the skel software instructions and without use of a memory shared by the digital signal processor and the application processor; and
    performing a service in the digital signal processor associated with the remote procedure call based on the skel software instructions and the unpacked argument data.

2. The method of claim 1, further comprising:
    transmitting a second signal to the digital signal processor indicating that the stub software instructions are preparing the first signal associated with the remote procedure call; and
    configuring the digital signal processor to execute the skel software instructions and the service related to the remote procedure call based on receiving the second signal.

3. The method of claim 2, wherein configuring the digital signal processor to execute the skel software instructions and the service related to the remote procedure call based on receiving the second signal comprises configuring the digital signal processor to wake from a sleep mode.

4. The method of claim 2, wherein configuring the digital signal processor to execute the skel software instructions and the service related to the remote procedure call based on receiving the second signal comprises configuring the digital signal processor to open a service session related to the remote procedure call.

5. The method of claim 1, further comprising:
    packing output argument data in the stack memory corresponding to the caller thread based on the local address space of the digital signal processor and the skel software instructions; and
    transmitting a return signal from the digital signal processor indicating that output argument data is within the stack memory corresponding to the caller thread.

6. The method of claim 5, further comprising:
    configuring the caller thread to operate in a wait mode in response to transmitting the first signal;
    configuring the caller thread to operate in an active mode in response to receiving the return signal from the digital signal processor; and
    unpacking the output argument data in the stack memory corresponding to the caller thread based on the stub software instructions.

7. The method of claim 5, further comprising unmapping from the local address space the physical memory addresses of the stack memory corresponding to the caller thread in response to transmitting the return signal and based on the skel software instructions.

8. The method of claim 1, wherein stub software instructions, header data and skel software instructions are generated by performing operations comprising:
    creating data that describes an interface description language that includes at least one remote procedure call capable of being performed by the service on the digital signal processor; and
    compiling in an interface description language compiler the created data describing the interface description language to generate stub software instructions formatted for execution by the application processor, skel software instructions formatted for execution by the digital signal processor, and header data formatted for compatibility with the application processor.

9. The method of claim 8, wherein the stub software instructions formatted for execution by the application processor are high-level programming language code instructions, and
    wherein the skel software instructions formatted for execution by the digital signal processor are assembly language code instructions.

10. The method of claim 1, wherein packing argument data in stack memory corresponding to the caller thread based on the stub software instructions further comprises:
    storing the constant-size arguments within a single input buffer in the stack memory corresponding to the caller thread; and
    storing pointers that describe physical memory addresses of the variable-size argument data structures within a buffer in the stack memory corresponding to the caller thread.

11. A computing device, comprising:
    means for executing stub software instructions on an application processor to perform a remote procedure call requested by a caller thread of an application, wherein the remote procedure call is defined in header data associated with the stub software instructions;
    means for executing skel software instructions on a digital signal processor to handle the remote procedure call requested by the caller thread;

means for packing argument data in a stack memory corresponding to the caller thread based on the stub software instructions comprising:
  means for organizing constant-size arguments and variable-size argument data structures of the argument data into a single argument buffer vector data structure; and
  means for pinning memory related to the single argument buffer vector data structure in the stack memory corresponding to the caller thread;
means for transmitting a first signal from the application processor that instructs the digital signal processor to execute the remote procedure call using physical memory addresses of the packed argument data;
means for mapping the physical memory addresses of the packed argument data in the stack memory corresponding to the caller thread to a local address space of the digital signal processor in response to receiving the transmitted first signal and based on the skel software instructions;
means for unpacking the argument data to the local address space from the stack memory by the digital signal processor based on the skel software instructions and without use of a memory shared by the digital signal processor and the application processor; and
means for performing a service in the digital signal processor associated with the remote procedure call based on the skel software instructions and the unpacked argument data.

12. The computing device of claim 11, further comprising:
means for transmitting a second signal to the digital signal processor indicating that the stub software instructions are preparing the first signal associated with the remote procedure call; and
means for configuring the digital signal processor to execute the skel software instructions and the service related to the remote procedure call based on receiving the second signal.

13. The computing device of claim 12, wherein means for configuring the digital signal processor to execute the skel software instructions and the service related to the remote procedure call based on receiving the second signal comprises means for configuring the digital signal processor to wake from a sleep mode.

14. The computing device of claim 12, wherein means for configuring the digital signal processor to execute the skel software instructions and the service related to the remote procedure call based on receiving the second signal comprises means for configuring the digital signal processor to open a service session related to the remote procedure call.

15. The computing device of claim 11, further comprising:
means for packing output argument data in the stack memory corresponding to the caller thread based on the local address space of the digital signal processor and the skel software instructions; and
for transmitting a return signal from the digital signal processor indicating that output argument data is within the stack memory corresponding to the caller thread.

16. The computing device of claim 15, further comprising:
means for configuring the caller thread to operate in a wait mode in response to transmitting the first signal;
means for configuring the caller thread to operate in an active mode in response to receiving the return signal from the digital signal processor; and
means for unpacking the output argument data in the stack memory corresponding to the caller thread based on the stub software instructions.

17. The computing device of claim 15, further comprising means for unmapping from the local address space the physical memory addresses of the stack memory corresponding to the caller thread in response to transmitting the return signal and based on the skel software instructions.

18. The computing device of claim 11, wherein stub software instructions, header data and skel software instructions are generated by performing operations comprising:
means for creating data that describes an interface description language that includes at least one remote procedure call capable of being performed by the service on the digital signal processor; and
means for compiling in an interface description language compiler the created data describing the interface description language to generate stub software instructions formatted for execution by the application processor, skel software instructions formatted for execution by the digital signal processor, and header data formatted for compatibility with the application processor.

19. The computing device of claim 18, wherein the stub software instructions formatted for execution by the application processor are high-level programming language code instructions, and
wherein the skel software instructions formatted for execution by the digital signal processor are assembly language code instructions.

20. The computing device of claim 11, wherein means for packing argument data in stack memory corresponding to the caller thread based on the stub software instructions further comprises:
means for storing the constant-size arguments within a single input buffer in the stack memory corresponding to the caller thread; and
means for storing pointers that describe physical memory addresses of the variable-size argument data structures within a buffer in the stack memory corresponding to the caller thread.

21. A computing device, comprising:
a memory;
a digital signal processor coupled to the memory; and
an application processor coupled to the memory and the digital signal processor, wherein the application processor is configured with processor-executable instructions to perform operations comprising:
  executing stub software instructions to perform a remote procedure call requested by a caller thread of an application, wherein the remote procedure call is defined in header data associated with the stub software instructions;
  packing argument data in stack memory corresponding to the caller thread based on the stub software instructions by:
    organizing constant-size arguments and variable-size argument data structures of the argument data into a single argument buffer vector data structure; and
    pinning memory related to the single argument buffer vector data structure in the stack memory corresponding to the caller thread; and
  transmitting a first signal that instructs the digital signal processor to execute the remote procedure call using physical memory addresses of the packed argument data, and
wherein the digital signal processor is configured with processor-executable instructions to perform operations comprising:
  executing skel software instructions to handle the remote procedure call requested by the caller thread;

mapping the physical memory addresses of the packed argument data in the stack memory corresponding to the caller thread to a local address space of the digital signal processor in response to receiving the transmitted first signal and based on the skel software instructions;

unpacking the argument data to the local address space from the stack memory by the digital signal processor based on the skel software instructions and without use of a memory shared by the digital signal processor and the application processor; and performing a service associated with the remote procedure call based on the skel software instructions and the unpacked argument data.

22. The computing device of claim 21, wherein the application processor is configured with processor-executable instructions to perform operations further comprising:

transmitting a second signal to the digital signal processor indicating that the stub software instructions are preparing the first signal associated with the remote procedure call, and wherein the digital signal processor is configured with processor-executable instructions to perform operations further comprising:

configuring the digital signal processor to execute the skel software instructions and the service related to the remote procedure call based on receiving the second signal.

23. The computing device of claim 22, wherein the digital signal processor is configured with processor-executable instructions to perform operations such that configuring the digital signal processor to execute the skel software instructions and the service related to the remote procedure call based on receiving the second signal comprises configuring the digital signal processor to wake from a sleep mode.

24. The computing device of claim 22, wherein the digital signal processor is configured with processor-executable instructions to perform operations such that configuring the digital signal processor to execute the skel software instructions and the service related to the remote procedure call based on receiving the second signal comprises configuring the digital signal processor to open a service session related to the remote procedure call.

25. The computing device of claim 21, wherein the digital signal processor is configured with processor-executable instructions to perform operations further comprising:

packing output argument data in the stack memory corresponding to the caller thread based on the local address space of the digital signal processor and the skel software instructions; and transmitting a return signal indicating that output argument data is within the stack memory corresponding to the caller thread.

26. The computing device of claim 25, wherein the application processor is configured with processor-executable instructions to perform operations further comprising:

configuring the caller thread to operate in a wait mode in response to transmitting the first signal;

configuring the caller thread to operate in an active mode in response to receiving the return signal from the digital signal processor; and unpacking the output argument data in the stack memory corresponding to the caller thread based on the stub software instructions.

27. The computing device of claim 25, wherein the digital signal processor is configured with processor-executable instructions to perform operations further comprising unmapping from the local address space the physical memory addresses of the stack memory corresponding to the caller thread in response to transmitting the return signal and based on the skel software instructions.

28. The computing device of claim 21, wherein the application processor is configured with processor-executable instructions to perform operations that generate stub software instructions, header data and skel software instructions such that generating stub software instructions, header data and skel software instructions comprises:

creating data that describes an interface description language that includes at least one remote procedure call capable of being performed by the service on the digital signal processor; and compiling in an interface description language compiler the created data describing the interface description language to generate stub software instructions formatted for execution by the application processor, skel software instructions formatted for execution by the digital signal processor, and header data formatted for compatibility with the application processor.

29. The computing device of claim 28, wherein the application processor is configured to execute software instructions that are high-level programming language code instructions, and wherein the digital signal processor is configured to execute software instructions that are assembly language code instructions.

30. The computing device of claim 21, wherein the application processor is configured with processor-executable instructions to perform operations such that packing argument data in stack memory corresponding to the caller thread based on the stub software instructions further comprises:

storing the constant-size arguments within a single input buffer in the stack memory corresponding to the caller thread; and storing pointers that describe physical memory addresses of the variable-size argument data structures within a buffer in the stack memory corresponding to the caller thread.

31. A non-transitory processor-readable storage medium having stored thereon processor-executable software instructions configured to cause an application processor within a computing device to perform operations comprising:

executing stub software instructions to perform a remote procedure call requested by a caller thread of an application, wherein the remote procedure call is defined in header data associated with the stub software instructions;

packing argument data in stack memory corresponding to the caller thread based on the stub software instructions by:

organizing constant-size arguments and variable-size argument data structures of the argument data into a single argument buffer vector data structure; and pinning memory related to the single argument buffer vector data structure in the stack memory corresponding to the caller thread; and transmitting a first signal that instructs a digital signal processor to execute the remote procedure call using physical memory addresses of the packed argument data, the non-transitory processor-readable storage medium also having stored thereon processor-executable software instructions configured to cause the digital signal processor within the computing device to perform operations comprising:

executing skel software instructions to handle the remote procedure call requested by the caller thread;

mapping the physical memory addresses of the packed argument data in the stack memory corresponding to the caller thread to a local address space of the digital signal processor in response to receiving the transmitted first signal and based on the skel software instructions;

unpacking the argument data to the local address space from the stack memory by the digital signal processor based on the skel software instructions and without use of a memory shared by the digital signal processor and the application processor; and performing a service associated with the remote procedure call based on the skel software instructions and the unpacked argument data.

32. The non-transitory processor-readable storage medium of claim 31, wherein the processor-executable software instructions are configured to cause the application processor within the computing device to perform operations further comprising:

transmitting a second signal to the digital signal processor indicating that the stub software instructions are preparing the first signal associated with the remote procedure call, and wherein the processor-executable software instructions are configured to cause the digital signal processor within the computing device to perform operations further comprising:

configuring the digital signal processor to execute the skel software instructions and the service related to the remote procedure call based on receiving the second signal.

33. The non-transitory processor-readable storage medium of claim 32, wherein the processor-executable software instructions are configured to cause the digital signal processor within the computing device to perform operations such that configuring the digital signal processor to execute the skel software instructions and the service related to the remote procedure call based on receiving the second signal comprises configuring the digital signal processor to wake from a sleep mode.

34. The non-transitory processor-readable storage medium of claim 32, wherein the processor-executable software instructions are configured to cause the digital signal processor within the computing device to perform operations such that configuring the digital signal processor to execute the skel software instructions and the service related to the remote procedure call based on receiving the second signal comprises configuring the digital signal processor to open a service session related to the remote procedure call.

35. The non-transitory processor-readable storage medium of claim 32, wherein the processor-executable software instructions are configured to cause the digital signal processor within the computing device to perform operations further comprising:

packing output argument data in the stack memory corresponding to the caller thread based on the local address space of the digital signal processor and the skel software instructions; and transmitting a return signal indicating that output argument data is within the stack memory corresponding to the caller thread.

36. The non-transitory processor-readable storage medium of claim 35, wherein the processor-executable software instructions are configured to cause the application processor within the computing device to perform operations further comprising:

configuring the caller thread to operate in a wait mode in response to transmitting the first signal;

configuring the caller thread to operate in an active mode in response to receiving the return signal from the digital signal processor; and unpacking the output argument data in the stack memory corresponding to the caller thread based on the stub software instructions.

37. The non-transitory processor-readable storage medium of claim 35, wherein the processor-executable software instructions are configured to cause the digital signal processor within the computing device to perform operations further comprising unmapping from the local address space the physical memory addresses of the stack memory corresponding to the caller thread in response to transmitting the return signal and based on the skel software instructions.

38. The non-transitory processor-readable storage medium of claim 31, wherein the processor-executable software instructions are configured to cause the application processor within the computing device to perform operations that generate stub software instructions, header data and skel software instructions such that generating stub software instructions, header data and skel software instructions comprises:

creating data that describes an interface description language that includes at least one remote procedure call capable of being performed by the service on the digital signal processor; and compiling in an interface description language compiler the created data describing the interface description language to generate stub software instructions formatted for execution by the application processor, skel software instructions formatted for execution by the digital signal processor, and header data formatted for compatibility with the application processor.

39. The non-transitory processor-readable storage medium of claim 38, wherein the processor-executable software instructions are configured to cause the application processor within the computing device to execute software instructions that are high-level programming language code instructions, and wherein the processor-executable software instructions are configured to cause the digital signal processor to execute software instructions that are assembly language code instructions.

40. The non-transitory processor-readable storage medium of claim 31, wherein the processor-executable software instructions are configured to cause the application processor within the computing device to perform operations such that packing argument data in stack memory corresponding to the caller thread based on the stub software instructions further comprises:

storing the constant-size arguments within a single input buffer in the stack memory corresponding to the caller thread; and storing pointers that describe physical memory addresses of the variable-size argument data structures within a buffer in the stack memory corresponding to the caller thread.

* * * * *